United States Patent [19]

Kashimura et al.

[11] Patent Number: 4,676,212
[45] Date of Patent: Jun. 30, 1987

[54] IGNITION TIMING CONTROL APPARATUS FOR AN INTERNAL COMBUSTION ENGINE HAVING A PLURALITY OF CYLINDERS

[75] Inventors: Yuichi Kashimura, Katsuta; Noboru Sugiura, Mito; Toshio Ishii, Katsuta; Masami Shida, Mito; Akira Teragakiuchi; Yasunori Mouri, both of Katsuta, all of Japan

[73] Assignee: Hitachi, Ltd., Tokyo, Japan

[21] Appl. No.: 834,967

[22] Filed: Feb. 28, 1986

[30] Foreign Application Priority Data

Mar. 1, 1985 [JP] Japan .................................. 60-38905
Mar. 2, 1985 [JP] Japan .................................. 60-40312

[51] Int. Cl.⁴ .............................................. F02P 5/14
[52] U.S. Cl. ................................... 123/425; 123/416; 123/417
[58] Field of Search ................. 123/425, 406, 417, 416

[56] References Cited

U.S. PATENT DOCUMENTS

| 4,376,429 | 3/1983 | Youngblood | 123/425 |
| 4,382,429 | 5/1983 | Enojhima et al. | 123/425 |
| 4,471,736 | 9/1984 | Yoshida et al. | 123/425 |
| 4,489,692 | 12/1984 | Naraguchi et al. | 123/425 |
| 4,508,079 | 4/1985 | Komurasaki et al. | 123/425 |
| 4,582,034 | 4/1986 | Iwata | 123/425 |
| 4,586,474 | 5/1986 | Akasu | 123/425 |
| 4,586,475 | 5/1986 | Takahoshi et al. | 123/425 |

Primary Examiner—Raymond A. Nelli
Attorney, Agent, or Firm—Antonelli, Terry & Wands

[57] ABSTRACT

An ignition timing control apparatus for an internal combustion engine having a plurality of cylinders. The apparatus includes a knock sensor for detecting a knocking condition in the engine, sensors for detecting other operating conditions of the engine, a microprocessor unit for receiving signals from the sensors to determine a basic ignition timing of the engine and generate an ignition timing control signal, and a power transistor circuit responsive to the ignition timing control signal from the microprocessor unit to switch on and off the primary current in an ignition coil and generate a high-voltage ignition signal. The microprocessor unit has a control function of retarding the basic ignition timing a predetermined amount in response to a knock detected during an ignition operation at the basic ignition timing and another control function of gradually restoring the retarded ignition timing to the basic ignition timing in response to a knock detected during an ignition operation at the retarded ignition timing from the basic ignition timing. The apparatus includes control means responsive to the occurrence of a knock to correct the basic ignition timing for each cylinder of the engine whereby the basic ignition timing of each cylinder is controlled to be retarded in response to the detection of a knock in each cylinder.

3 Claims, 17 Drawing Figures

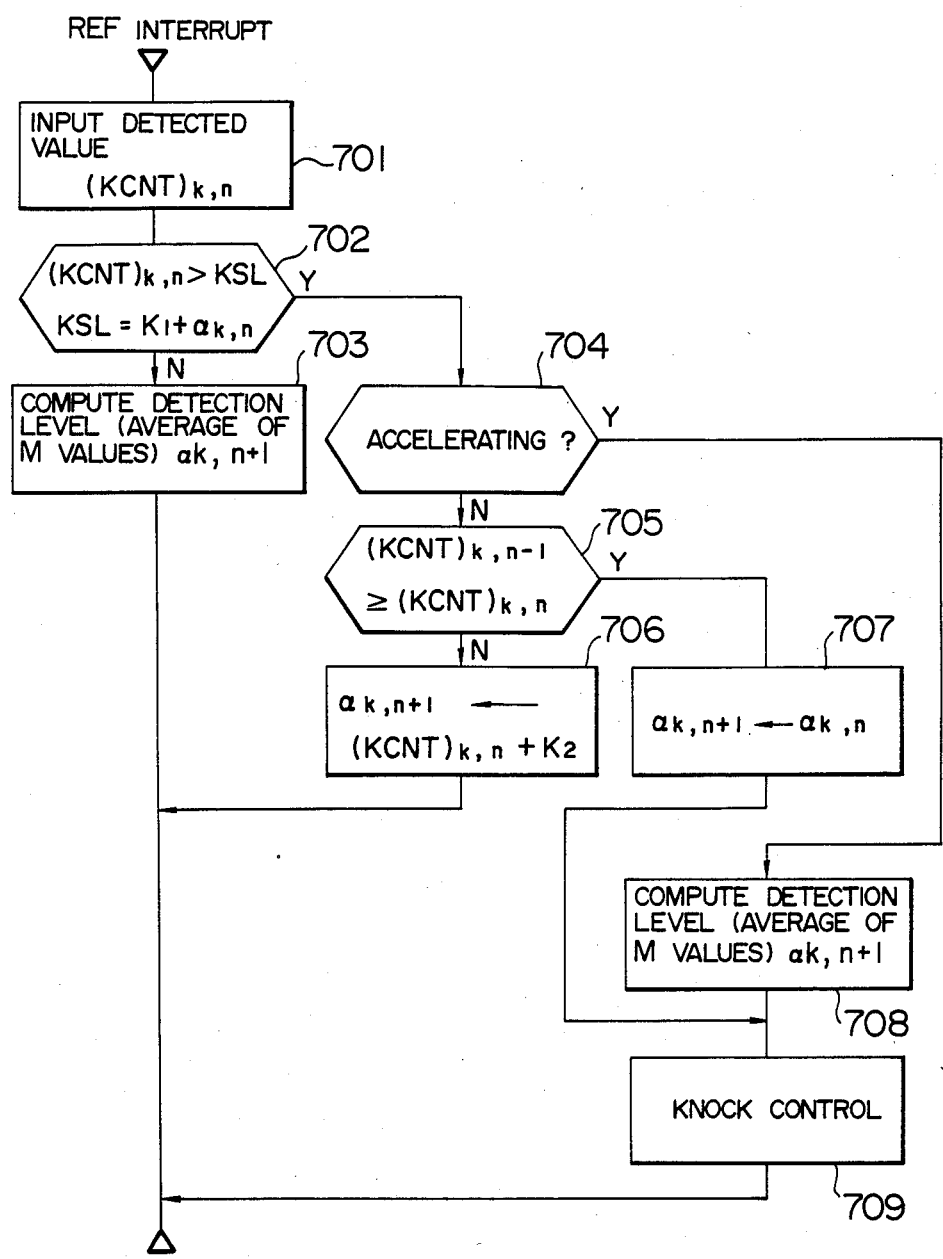

IGNITION TIMING CONTROL APPARATUS FOR AN INTERNAL COMBUSTION ENGINE HAVING A PLURALITY OF CYLINDERS

BACKGROUND OF THE INVENTION

The present invention relates to an ignition timing control apparatus for gasoline engines, etc., and more particularly to an ignition timing control apparatus having a knock control function.

With gasoline engines, etc., attempts to enhance their performance often lead to many detrimental effects due to engine knocking.

Thus, devices of the type employing a sensor for detecting knocking so that upon occurrence of knocking the ignition timing is immediately retarded to prevent the knocking, that is, so-called knock control devices, have recently come into wide use.

With the known type of knock control devices, when knocking occurs, the ignition timing is retarded a predetermined amount and then the ignition timing is gradually restored to the basic ignition timing providing the same amount of ignition timing retard for all the cylinders of the engine (e.g., Japanese Patent Unexamined Publication No. 57-38667).

Also, with gasoline engines, etc., the knocking ignition timing differs considerably among the cylinders depending on the engine with the result that in the case of the known knock control device, despite the knock control being performed, the cylinders having a high knocking tendency always cause knocking.

Assuming now that the basic ignition timing is set in relation to the cylinder having the highest knocking tendency, it is impossible to ensure a satisfactory engine performance. On the other hand, if the basic ignition timing is set in relation to the cylinder having the lowest knocking tendency, the cylinders having the higher knocking tendency always remain in the knocking zone so that these cylinders always cause middle or heavy knocking during the interval between the time that the ignition timing is retarded and the time that the ignition timing is restored to the basic ignition timing. Note that the terms middle knock and heavy knock indicate degrees of knocking, that is, middle knock designates a medium degree of knocking and heavy knock designates a considerably high degree of knocking. Also, a light degree of knocking is called light knock and a very low degree of knocking is referred to as a trace knock.

Thus, the conventional knock control devices are disadvantageous in that the variations in knocking characteristics among the cylinders are not accommodated and the desired engine performance is not ensured fully.

This type of knock control device is disclosed for example in Japanese Patent Unexamined Publication No. 58-167880.

The known knock control devices are also disadvantageous in that, if there are variations in knock intensity among the cylinders of an engine, there is the danger of failing to detect knocking with respect to some cylinders and thus a failure to satisfactorily prevent the occurrence of knocking. Moreover, the engine and sensor undergo aging so that it has been difficult in the past to ensure satisfactory detection of knocking and hence prevent the occurrence of knocking.

SUMMARY OF THE INVENTION

It is an object of the present invention to provide an ignition timing control apparatus for an internal combustion engine which overcomes the foregoing deficiencies in the prior art and is capable of always ensuring satisfactory engine performance and satisfactorily preventing the occurrence of knocking even if there are variations in knocking characteristics among the cylinders of an engine.

It is another object of the invention to provide an ignition timing control apparatus for an internal combustion engine which is capable of always detecting the occurrence of knocking positively and of preventing the occurrence of knocking satisfactorily irrespective of the variations in knocking characteristics among the engine cylinders and the aging of the sensor.

To accomplish the first object, in accordance with the invention the basic ignition timing of each cylinder is controlled in response to the knocking conditions in each cylinder.

To accomplish the second object, in accordance with the invention the level of a detection signal corresponding to the detection of knocking with no ignition timing retard is compared with the level of a detection signal generated at the retarded ignition timing so that when the level of the latter is higher than the former, the knock detection level is corrected.

BRIEF DESCRIPTION OF THE DRAWINGS

FIG. 13 is a flow chart showing an example of a rotation synchronization processing routine.

DESCRIPTION OF THE PREFERRED EMBODIMENTS

An ignition timing control apparatus for an internal combustion engine according to the invention will now be described in detail with reference to the illustrated embodiments.

Figure 1:
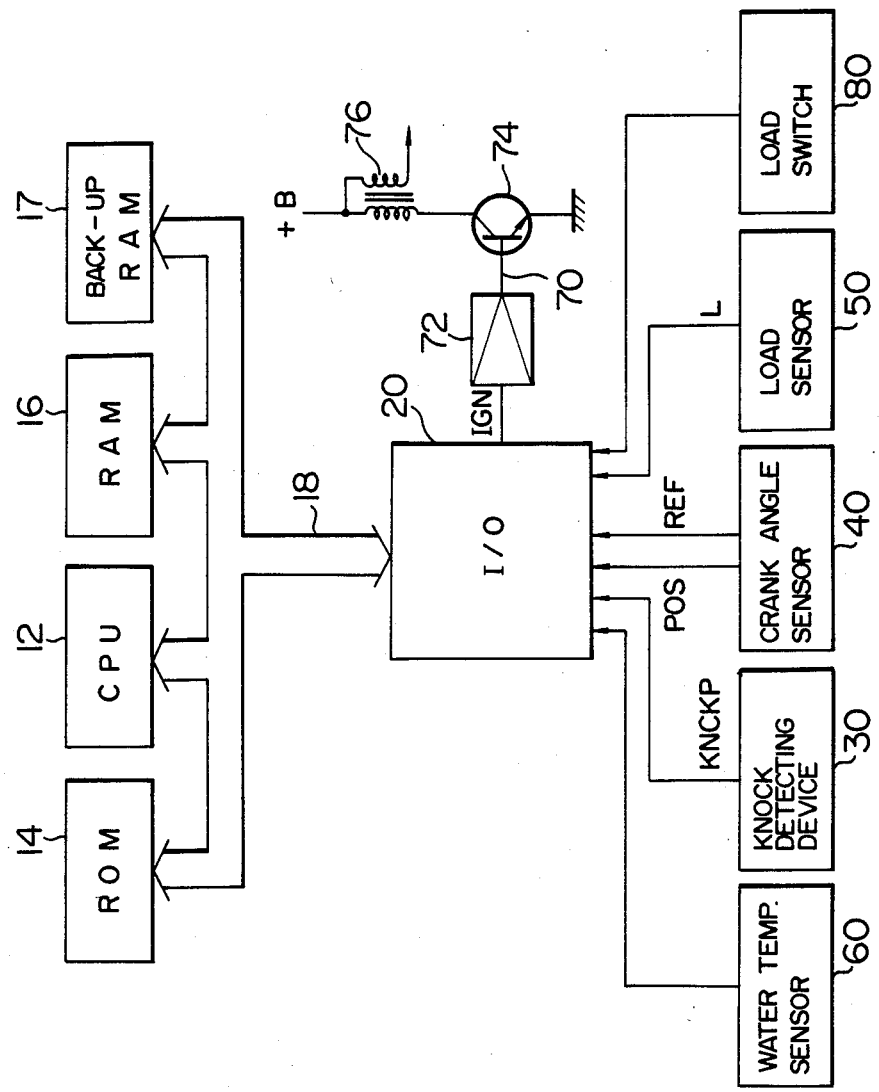
FIG. 1 is a block diagram showing an embodiment of an ignition timing control apparatus according to the invention.

Referring to FIG. 1 illustrating an embodiment of the invention, a central processing unit or CPU 12 performs digital computations of various data such as the ignition timing of the engine. A ROM 14 stores an ignition timing control program and fixed data. A RAM 16 is a read/write memory device. A back-up RAM 17 is a RAM for holding the data even when the engine is stopped.

The CPU 12 receives a signal from each of various sensors (this embodiment uses a knock detecting device 30, a crank angle sensor 40, a load sensor 50, a water temperature sensor 60 and a load switch 80) through an input/output interface circuit 20, so that in accordance with the program stored in the ROM 14 an ignition timing is computed on the basis of these signals and the ignition signal IGN is generated through the input/output interface circuit 20. The ignition signal IGN is applied to a base 70 of a power transistor 74 through an amplifier 72 and the power transistor 74 is turned on. When the power transistor 74 is turned off, an ignition current is produced in the secondary winding of an ignition coil 76.

Figure 2:
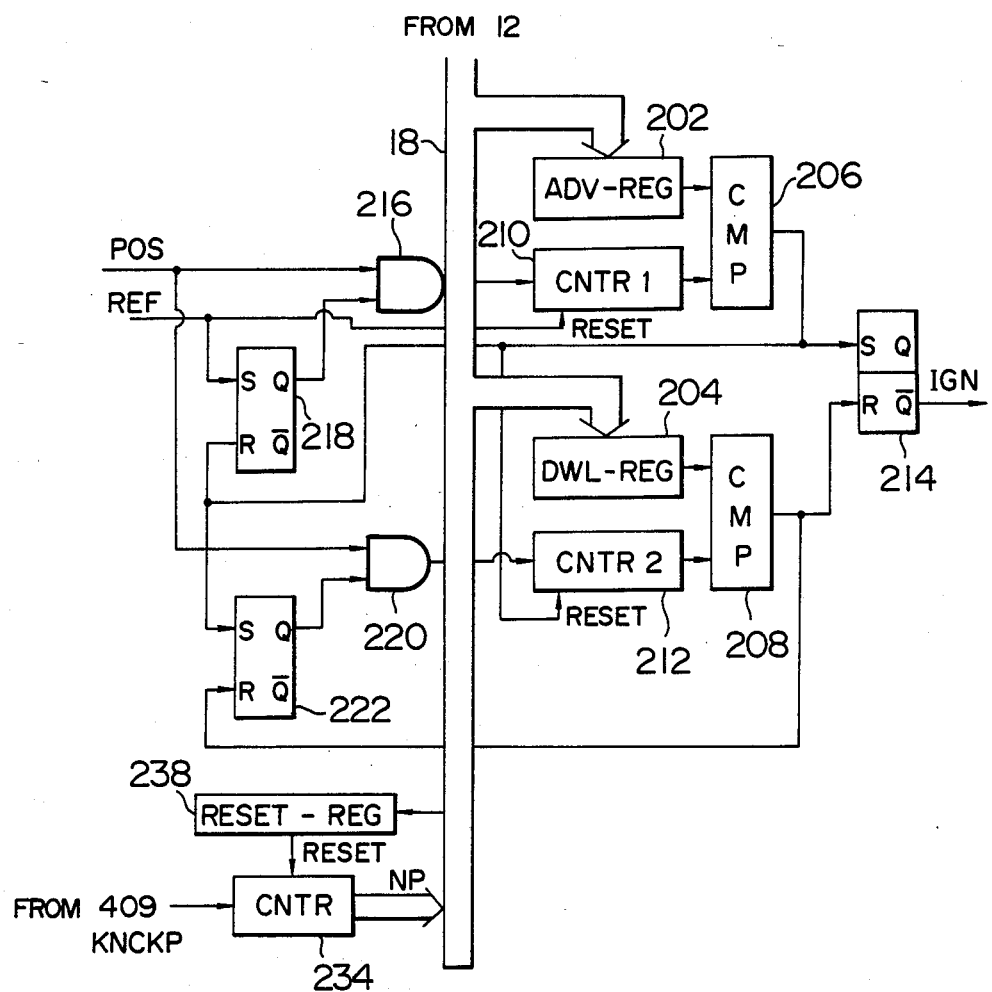
FIG. 2 is a block diagram showing an embodiment of the input/output interface according to the invention.

FIG. 2 shows a detailed construction of a portion of the input/output interface circuit 20 operatively associated with the ignition timing control.

The crank angle sensor 40 applies position pulse signals POS to AND circuits 216 and 220. The crank angle sensor 40 also applies a reference crank angle signal REF to the reset terminal of a first counter register 210 and the set terminal of an R-S flip-flop 218. The first counter register 210 is responsive to the leading edge of the signal REF to start counting the signals POS through the AND circuit 216 and the R-S flip-flop 218 and the resulting count is applied to a comparator 206. The comparator 206 compares the count of the first counter register 210 and the ignition timing data $\theta_{ig}$ computed by the CPU 12 and stored in an advance register 202, so that when the two are equal, a set pulse is applied to an R-S flip-flop 214 and the R-S flip-flop 218 is reset. When the set pulse is applied to the R-S flip-flop 214, its $\overline{Q}$ output is interrupted and the ignition power transistor 74 is turned off thus supplying a discharge current to the secondary winding of the ignition coil 76.

The timing of starting current supply to the ignition coil 76 will now be described.

In response to the set pulse generated from the comparator 206 to set an R-S flip-flop 222, a second counter register 212 starts the counting of position pulses POS through the AND circuit 220 and the resulting count is applied to a comparator 208. The comparator 208 compares this count and the value computed by the CPU 12 and stored in a dwell register 204 so that when the two are equal, a reset pulse is applied to the R-S flip-flop 214 and the R-S flip-flop 222 is reset. In response to the reset pulse, the R-S flip-flop 214 generates an output at its $\overline{Q}$ terminal so that the power transistor 74 is turned on and the flow of current to the primary winding of the ignition coil 76 is started.

Next, the introduction of a knock signal KNCKP into the CPU 12 will be described.

The knock signal KNCKP generated from the knock detecting device 30 is applied to a counter register 234 and a number of knock pulses proportional to the intensity of the knock produced are counted. The CPU 12 receives the count of the counter register 234 through a bus 18.

The pulse count NP thus applied to the CPU 12 is the data corresponding to the knock intensity and it is used for the computation of an ignition timing correction amount.

Figure 3:
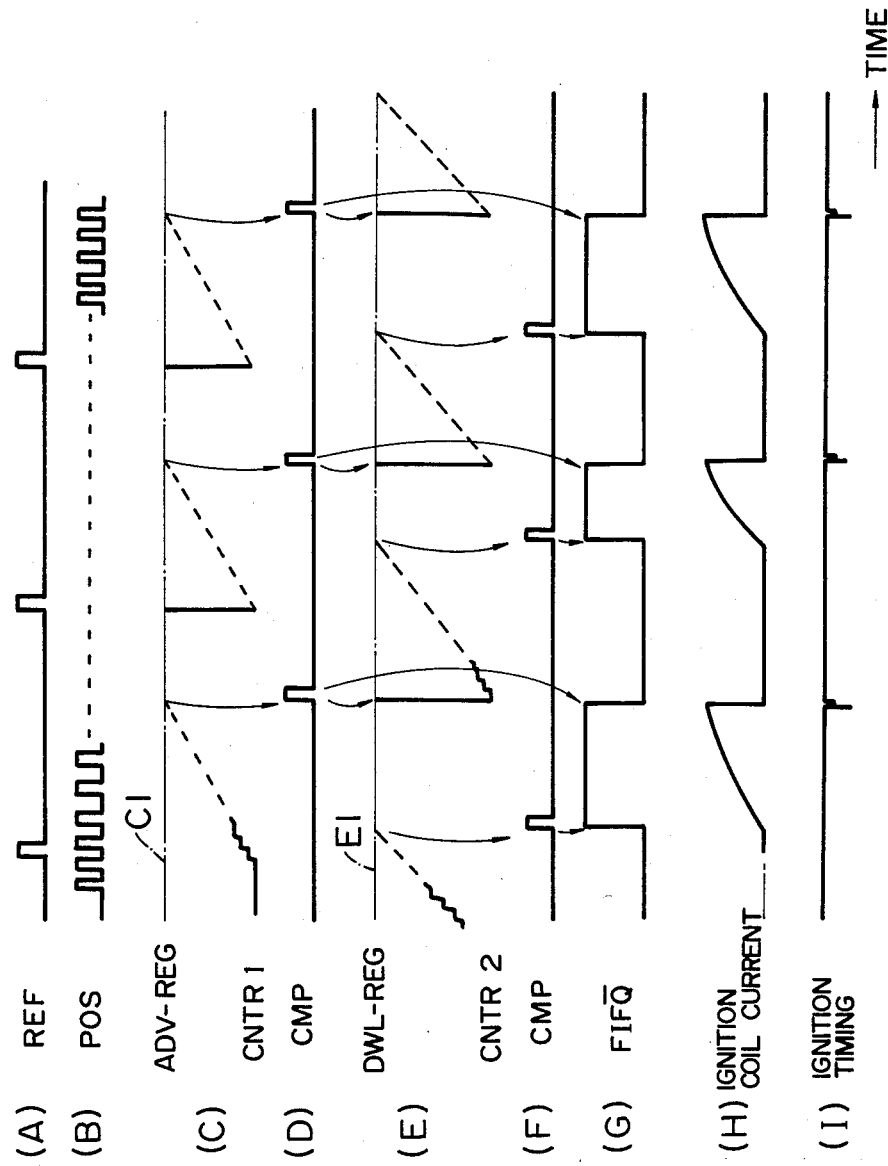
FIG. 3 is a time chart for explaining the operation of the invention.

FIG. 3 is a timing chart showing the operation of the above-mentioned circuits of FIG. 2. In FIG. 3, (A) shows a reference crank angle signal, (B) a position pulse signal, (C) the count of the first counter register 210, and $C_1$ the preset value in the advance register 202. (D) shows the output signal of the comparator 206 which is generated when the count of the first counter register 210 attains the preset value in the advance register 202. (E) shows the count of the second counter register 212, and ($E_1$) the preset value in the dwell register 204. (F) shows the output of the comparator 208 which is the same in operation with the comparator 206, and (G) the $\overline{Q}$ output of the R-S flip-flop 214 which is responsive to the outputs of the comparators 206 and 208 or the signals D and F. (H) shows the current in the ignition coil 76 which is supplied in response to the $\overline{Q}$ output, and (I) the ignition timing.

Figure 4:
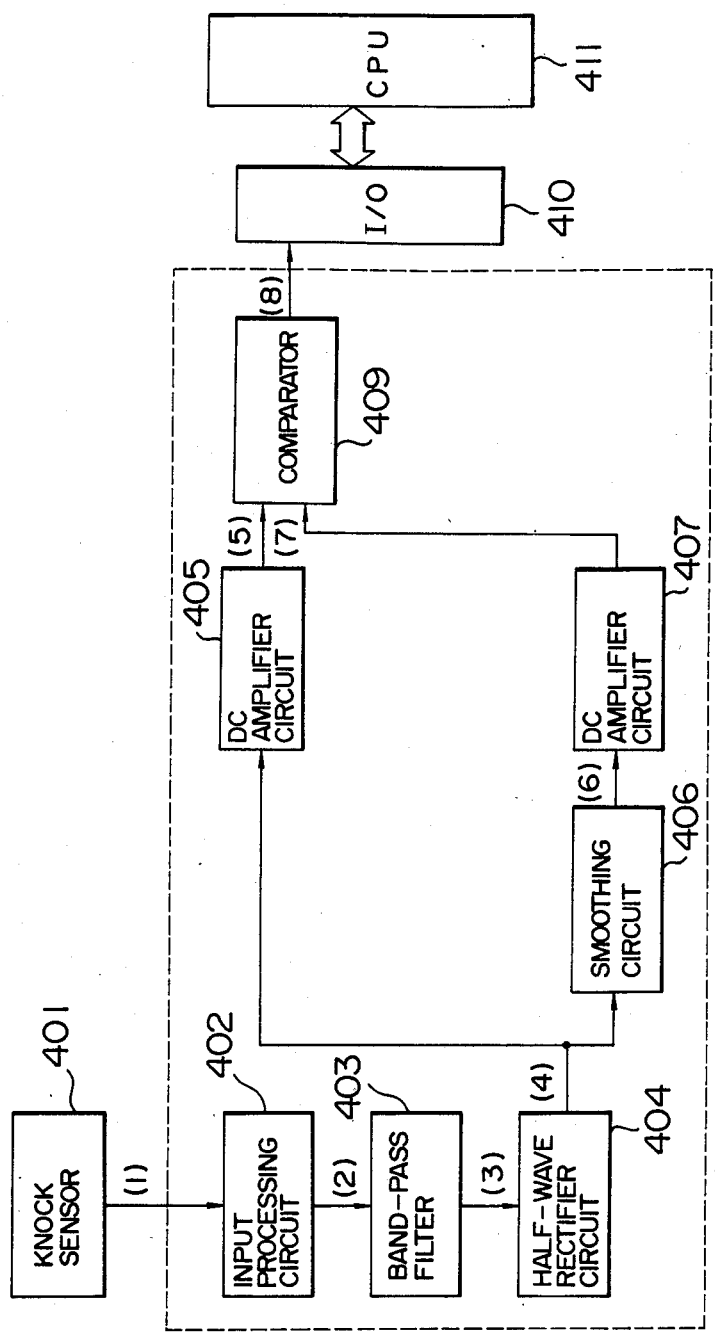
FIG. 4 is a block diagram showing an embodiment of the knock detecting device.

Referring now to FIG. 4, there is illustrated a block diagram of the knock detecting device 30 which is responsive to the occurrence of knocking to generate a number of pulses corresponding to the intensity of the knock. In the Figure, a knock sensor 401 comprises a piezoelectric element to convert the knocking vibrations of the engine cylinder to an electric signal. The output signal $V_{IN}$ of the knock sensor 401 is applied to a band-pass filter 403 through an input processing circuit 402. The band-pass filter 403 is provided to remove the parasitic oscillations of the engine and efficiently take out a knock signal and its band width is selected to correspond with those frequencies at which a knock signal is generated.

The knock signal passed through the band-pass filter 403 is first half-wave rectified by a half-wave rectifier circuit 404 and then it is branched into two paths. Thus, on the one hand, the signal is amplified as a knock representative signal by a dc amplifier circuit 405, and on the other hand is amplified as a discrimination level for knock detection by a dc amplifier circuit 407 after it has been smoothed by a smoothing circuit 406. A comparator 409 compares the two signals so that a knock detection signal is generated and applied to an I/O circuit 410.

Figure 5:
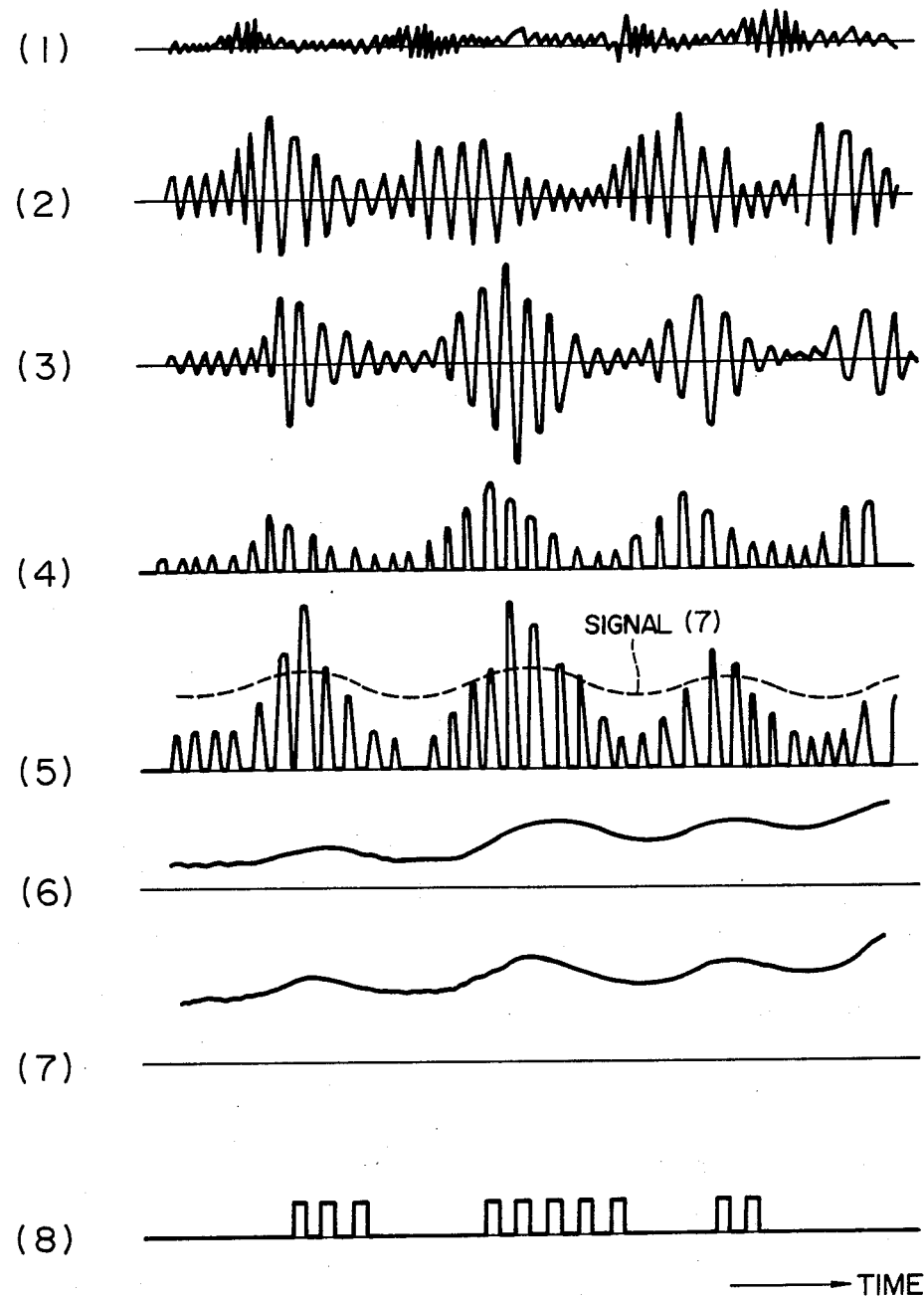
FIG. 5 illustrates a plurality of signal waveforms useful for explaining the operation of the knock detecting device.

FIG. 5 shows the signal waveforms generated at various points in the block diagram shown in FIG. 4. (1) shows the output waveform of the knock sensor 401, (2) the output waveform of the input processing circuit 402, (3) the output waveform of the band-pass filter 403, (4) the output waveform of the half-wave rectifier circuit 404, (5) the output waveform of the amplifier circuit 405, (6) the output waveform of the smoothing circuit 406, (7) the output waveform of the amplifier circuit 407, and (8) the knock detection signal KNCKP or the output waveform of the comparator 409.

Figure 6:
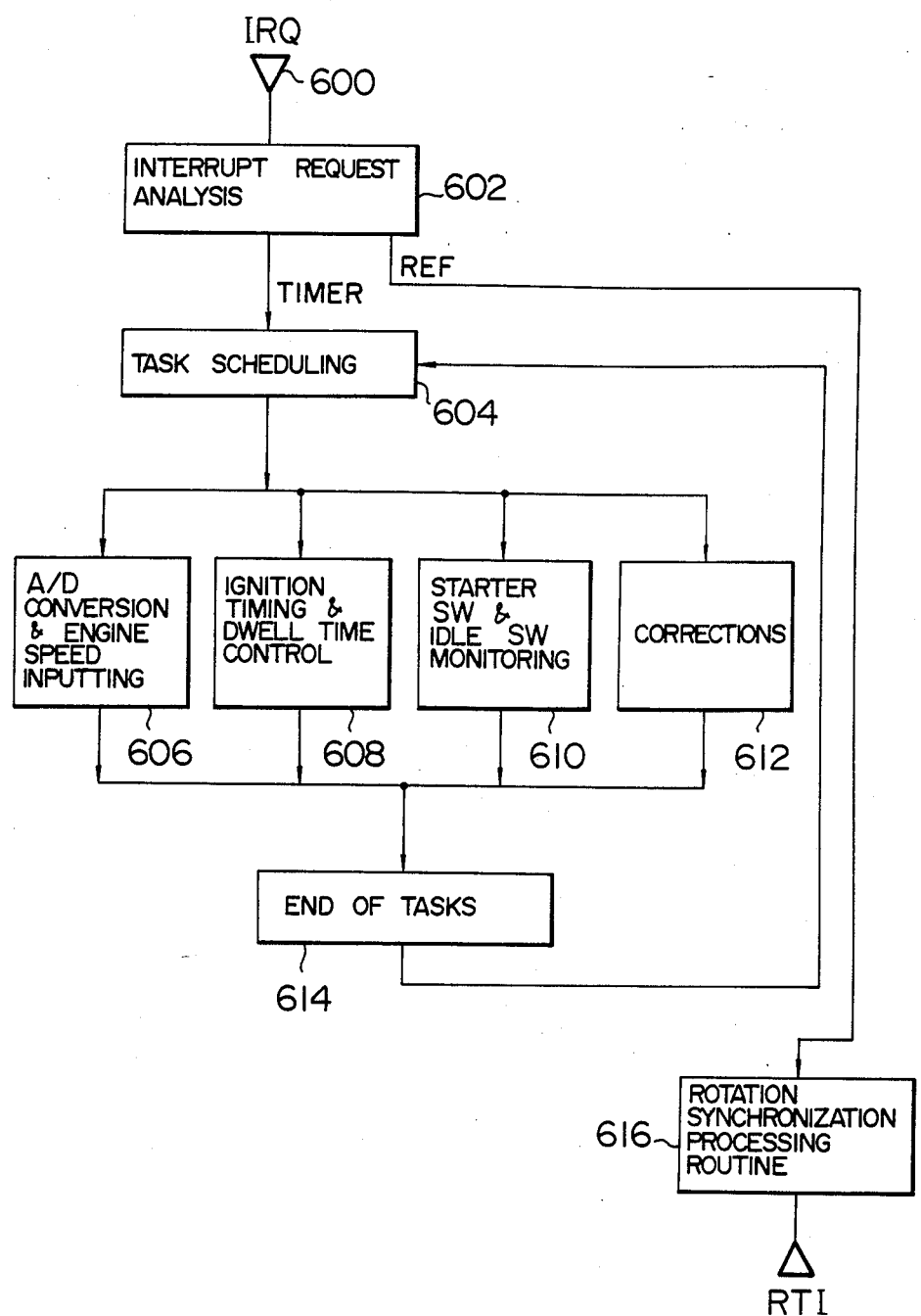
FIG. 6 is a general flow chart for the embodiment of the invention.

FIG. 6 shows a general flow chart of the ignition timing control apparatus according to the present embodiment.

In the Figure, when an interrupt request 600 is generated, whether it is a reference (REF) or timer interrupt is determined by the interrupt request analytic processing of the next step 602. If it is the timer interrupt (TIMER), tasks including an input signal A/D conversion and engine speed inputting task (606), a basic ignition timing and dwell time computing task (608) a digital input signal processing task (610) and a correction task (612) are performed.

Figure 7:
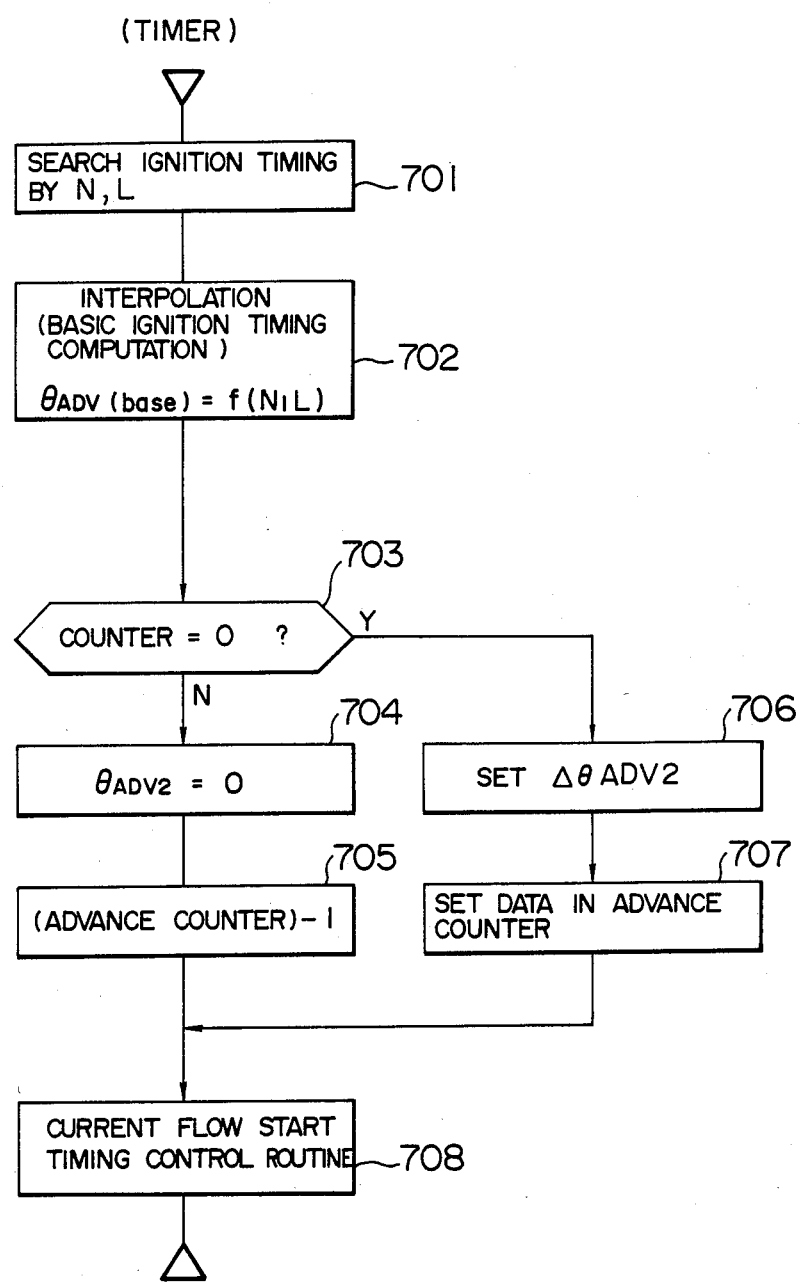
FIG. 7 is a diagram showing an ignition timing control routine.

FIG. 7 shows an ignition timing and dwell time control routine corresponding to the step 608 in FIG. 6 and this routine computes a basic ignition timing $\theta_{ADV}$(base) from an equation $\theta_{ADV}$(base)=f (N, L). Here, N represents the engine speed and L the engine load (e.g., the intake manifold vacuum).

First a basic ignition timing processing is performed at steps 701 and 702. At a step 703, the counter data for advancing after the ignition retard is determined. If the counter content is zero, it is determined that a given period of time (e.g., a second) has elapsed and a transfer is made to a step 706. Thus, an advancing data $\Delta\theta_{ADV2}$ is set at the step 706. Then, since the given time has elapsed, a lapse of given time confirming data is set in the counter at a step 707 and a transfer is made to a step 708.

On the contrary, if the counter data is not zero at the step 703, it is an indication that the given time has not elapsed and the advance data $\Delta\theta_{ADV2}$ is set to 0. This is done at a step 704. At a step 705, the counter data is decreased by 1 so as to measure the passage of time. Then, a transfer is made to the step 708.

Figure 8:
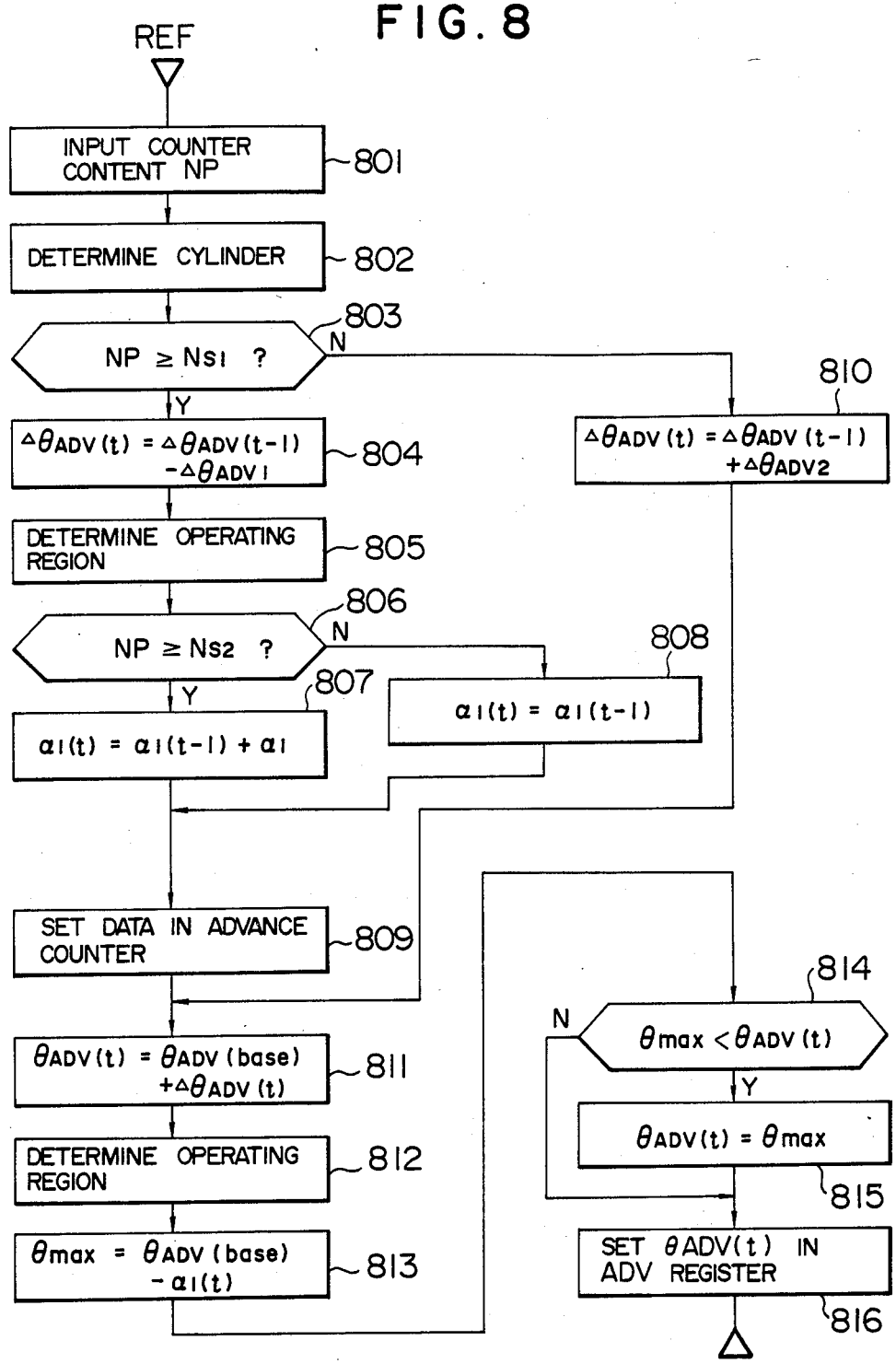
FIG. 8 is a diagram showing a rotation synchronization routine.

FIG. 8 shows a rotation synchronization processing routine corresponding to a step 616 of FIG. 6.

At a step 801, the counter date (the number of pulses NP) is inputted. After the inputting, the counter is cleared. At a step 802, the corresponding cylinder is discriminated and the knock discrimination level (the number of pulses) corresponding to the current cylinder is searched. This discrimination level is a function of the engine speed and load. At a step 803, the counter data NP and the searched knock discrimination level $N_{SI}$ are compared. This discrimination level $N_{SI}$ is used for performing the ordinary ignition timing control. If the counter data NP is greater than the discrimination level $N_{SI}$, the presence of knocking is determined and a transfer is made to a step 804 thereby retarding the ignition timing. Here, $\Delta\theta_{ADV1}$ represents the current correction amount and $\Delta\theta_{ADV}(t-1)$ represents the preceding correction amount (the amount of retard).

Figure 10:
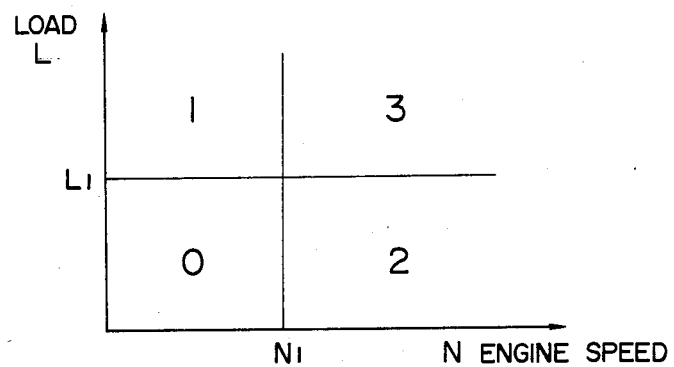
FIG. 10 is a diagram for explaining the operating regions according to the first embodiment of the engine.

At a step 805, in accordance with the current engine speed N and load L, corresponding one of the regions shown in FIG. 10 (while the four regions are provided in accordance with the engine speeds N and loads L, they may be provided in accordance with only the speeds or the loads and alternatively a greater number of regions may be provided) is discriminated and a maximum advance angle determining data $\alpha_1$ is searched. At a step 806, the value NP of the counter is compared with a discrimination level $N_{S2}$ for controlling the maximum advance angle. If the value of NP is greater than $N_{S2}$ at the step 806, it is determined that the current knock condition is middle knock and a computation of $\alpha_1(t)=\alpha_1(t-1)+\alpha_1$ for correcting the maximum advance angle (the maximum value of the advance after the ignition retard) is performed at a step 807. Also, when the counter value NP is smaller than $N_{S2}$ at the step 806, it is predetermined that the maximum advance angle need not be corrected and the previous value is used as $\alpha_1(t)=\alpha_1(t-1)$. Then, a transfer is made to a step 809. The step 809 sets in the advance counter the data for advancing after the ignition timing has been retarded upon the occurrence of knocking (in this embodiment data corresponding to 1 second is set). Note that the counter is operated by a TIMER interrupt to determine whether a predetermined time has elapsed. Then, a transfer is made to a step 811.

On the other hand, if the step 803 determines that $NP<N_{S1}$, the absence of knock is determined and a transfer is made to a step 810. The step 810 performs the ignition advance after the retard. However, since the data $\Delta\theta_{ADV2}$ is set to 0 at the step 704 if the predetermined time (1 second) has not elapsed, no ignition advance is made and the data $\Delta\theta_{ADV}(t)$ assumes the previous value.

$$\theta_{ADV}(t)=\theta_{ADV}(\text{base})+\Delta\theta_{ADV}(t)$$

At a step 811, the basic ignition timing $\theta_{ADV}$(base) and the ignition timing correction amount are added up and thus the ignition timing $\theta_{ADV}(t)$ is determined.

At a step 812, the current operating region (FIG. 10) is searched and the maximum advance angle correction amount $\alpha_1(t)$ corresponding to the region is obtained.

At a step 813, the maximum advance angle $\theta_{max}$ is controlled in accordance with the current basic ignition timing $\theta_{ADV}$(base) and the correction amount $\alpha_1(t)$, as follows $$\theta_{max}=\theta_{ADV}(\text{base})-\alpha_1(t).$$

At a step 814, the maximum advance angle $\theta_{max}$ and the current ignition timing $\theta_{ADV}(t)$ are compared. If the step 814 determines that $\theta_{max}<\theta_{ADV}(t)$, a transfer is made to a step 815 and the maximum advance angle is set to $\theta_{max}$. If the step 814 determines that $\theta_{max}<\theta_{ADV}(t)$, the current ignition timing still leaves margine for further advance and the current value is set in the ADV register at a step 816. As the result of the foregoing control, the advance angle after the retard is controlled at $\theta_{max}$ at the most. If there is no occurrence of knocking, the ignition timing for this cylinder is maintained at $\theta_{max}$ so that the basic ignition timing is controlled as shown by the following equation $$\theta_{max}=\theta_{ADV}(\text{base})-\alpha_1(t)$$

As described hereinabove, the above basic ignition timing is corrected for each cylinder and this prevents the frequent occurrence of middle knock.

Figure 9:
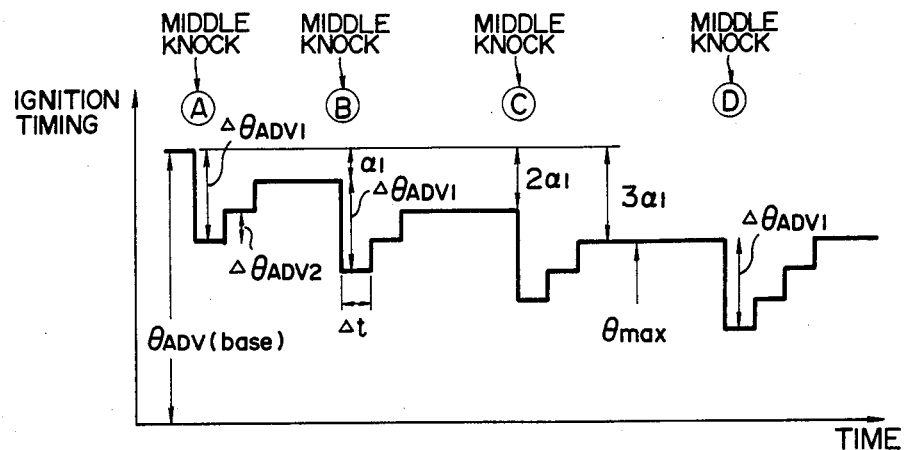
FIG. 9 is a timing chart for explaining the operation of the first embodiment of the invention.

Referring to FIG. 9 showing a timing chart for explaining the operation of this embodiment, if middle knock occurs at (A) in one cylinder operating at the basic ignition timing $\theta_{ADV}$(base) (when NP of the step 801 of FIG. 8 is $NP>N_{S2}$), the ignition timing is retarded by $\Delta\theta_{ADV1}$ so that if the knocking no longer occurs, the ignition timing is advanced at the rate of $\Delta\theta_{ADV2}$ per $\Delta t$ (1 second). At this time the advance angle is controlled at $\theta_{ADV}$(base)$-\alpha_1$ in accordance with $\theta_{max}=\theta_{ADV}(\text{base})-\alpha_1(t)$.

If middle knock occurs at (B) in the same cylinder in the same operating region, the advance angle is controlled at $\theta_{max}=\theta_{ADV}(\text{base})-2\alpha_1$.

If middle knock occurs at (C), the maximum advance angle is controlled at the following $$\theta_{max}=\theta_{ADV}(\text{base})-3\alpha_1$$

At this time, if trace knock occurs at (D), the ignition timing is first retarded by $\Delta\theta_{ADV1}$ and then advanced at the rate of $\Delta\theta_{ADV2}$ per $\Delta t$ (1 second) until finally attaining $\theta_{max} = \theta_{ADV}(\text{base}) - 3\alpha_1$. In other words, this means that in this operating region, the basic ignition timing of this cylinder is changed to $\theta_{ADV}(\text{base}) - 3\alpha_1$ and the knocking is reduced to a suitable level.

This control is performed in the same manner on the ignition timing of the remaining cylinders. Thus, in accordance with this embodiment, the desired retard control of the basic ignition timing is provided for each cylinder in accordance with the occurrence of knocking in the cylinder thus enhancing the engine performance to the utmost extent while satisfactorily reducing the ill effects of knocking.

As described hereinabove, in accordance with the invention, by virtue of the fact that the desired corrective control of the basic ignition timing is provided for each cylinder in accordance with the occurrence of knocking in the cylinder, there is easily provided an ignition timing control apparatus which overcomes the deficiencies in the prior art and is capable of always accurately providing the desired retard control of the ignition timing in accordance with the occurrence of knocking in each cylinder and ensuring full advantage of the engine performance.

Figure 11:
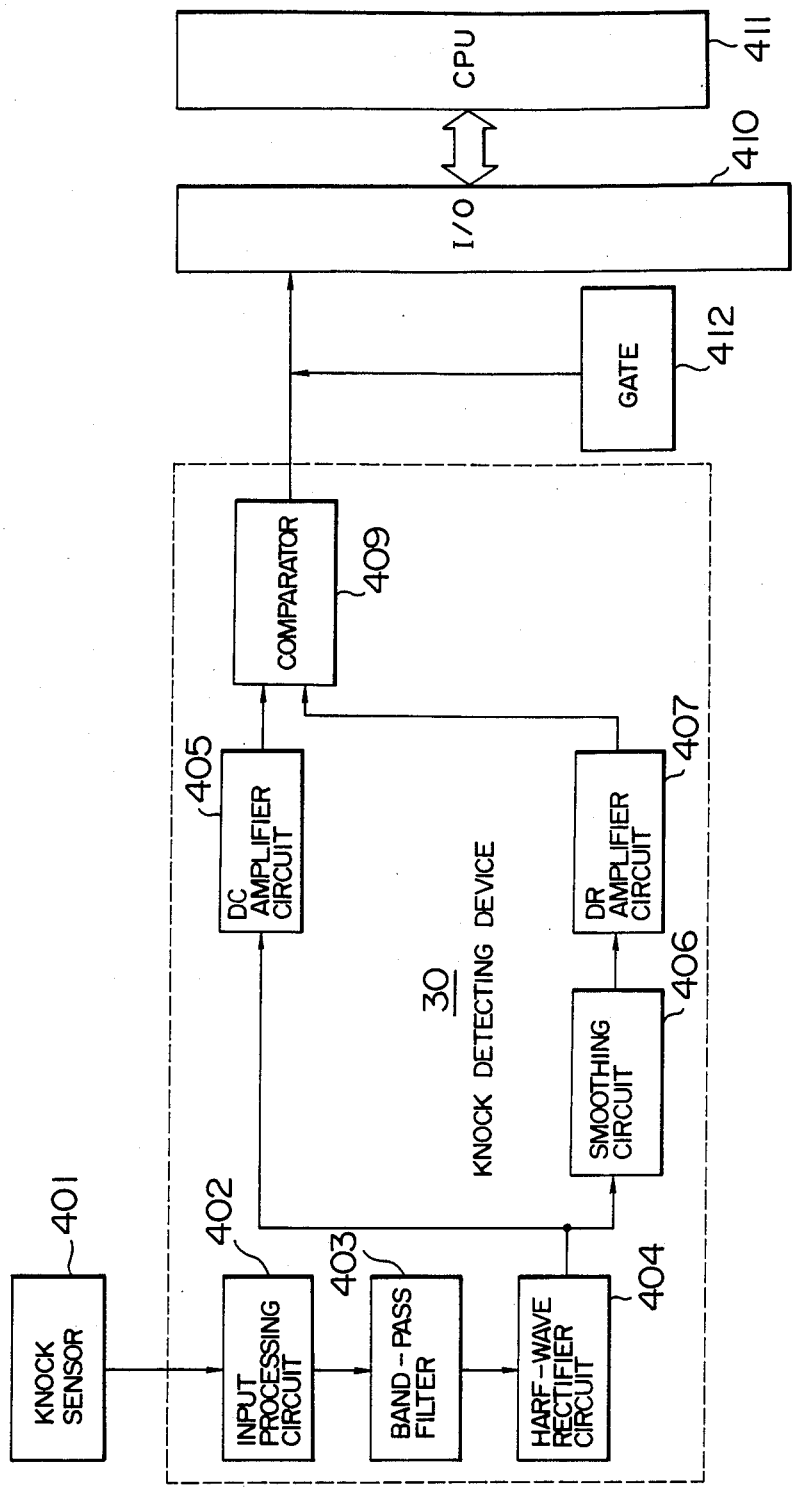
FIG. 11 is a block diagram showing another embodiment of the knock detecting device.

Referring to FIG. 11 showing another embodiment of the invention, there is illustrated a block diagram of a knock detecting device 30 which generates a number of pulses corresponding to the intensity of the knocking. In the Figure, a knock sensor 401 converts vibrations of the engine to an electric signal. The knock sensor 401 applies its output signal $V_{IN}$ to a band-pass filter 403 through an input processing circuit 402. The band-pass filter 403 is provided to remove the parasitic oscillations of the engine and efficiently generate a knock signal and its band width is selected to correspond with those frequencies at which a knock signal is generated.

The knock signal passed through the band-pass filter 403 is half-wave rectified by a half-wave rectifier circuit 404 and it is then branched into two paths. Thus, on the one hand, the signal is amplified as a knock representative signal by a dc amplifier 405, while on the other hand, the signal is smoothed by a smoothing circuit 406 and then amplified by a dc amplifier circuit 407 to provide a discrimination level for knock detecting purposes. A comparator 409 compares the signals from the two paths so that a knock detection signal is generated and applied to an I/O unit 410. The output of the comparator 409 is applied to the I/O unit 410 at a specified timing (more particularly, at 10 to 70 degrees ATDC).

The operation of this embodiment will now be described with reference to FIGS. 12 and 13. Note that this embodiment is applied to a four cylinder engine.

Figure 12:
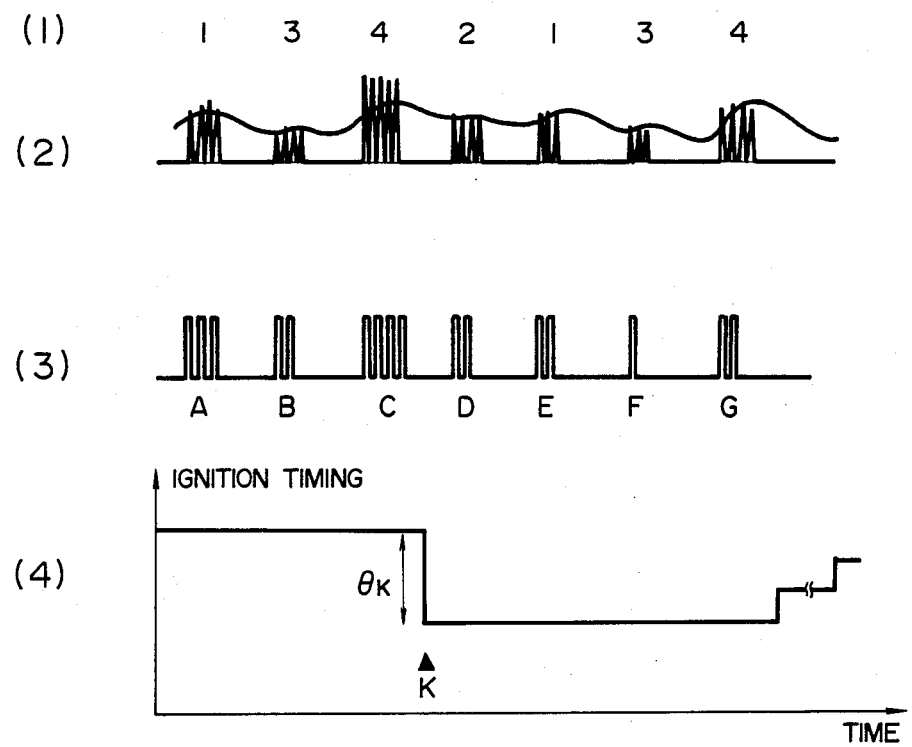
FIG. 12 illustrates a plurality of signal waveforms useful for explaining the operation of the knock detecting device of FIG. 11.

Shown in (1) of FIG. 12 are the engine cylinder numbers. More specifically, numeral 1 designates the No. 1 cylinder and numeral 3 designates the No. 3 cylinder (the same applies similarly to the following). Shown in (2) are waveforms at the same points as in (5) of FIG. 5, and (3) the output of the comparator 409 as in (8) of FIG. 5 Shown in (4) is the ignition timing of the No. 4 cylinder. In other words, a condition is shown in which the ignition timing is retarded by $\theta_K$ at a point K in response to the occurrence of knocking in the No. 4 cylinder. Noting the No. 4 cylinder alone, the detected value at the time of the occurrence of knocking is 4 (the point C) and the detected value upon retarding of the ignition timing is 2 (the point G). This shows that the occurrence of knocking is eliminated by the retarding of the ignition timing. In this case, if the detected value at the point G is not 2 but 5, for example, this detected value is not due to the occurrence of knocking but is due to some other cause such as noise and thus the detection level is corrected. This is the principle.

The correction of the knock detection level will now be described with reference to the flow chart of FIG. 13.

At a step 701, the output of the comparator 409 of FIG. 11 is inputted. While the output is a number of pulses in the case of FIG. 11, it may take any other form than a number of pulses, e.g., a voltage. With the output $(KCNT)_{k,\,n}$ at the step 701, k and n indicate the nth ignition of the No. k cylinder. At a step 702, the detected value $(KCNT)_{k,\,n}$ at the nth ignition of the No. k cylinder is compared with the knock detection level $K_{SL}$ of the No. k cylinder. The knock detection level $K_{SL}$ is the sum of the basic detection level $K_I$ (more specifically $K_I = 3$) and the knock detection level correction amount at the nth ignition of the No. k cylinder as follows $$K_{SL} = K_I + \alpha_{k,\,n}$$

If the result of the comparison at the step 702 shows that $(KCNT)_{k,\,n} \leq K_{SL}$, it is determined that there is no occurrence of knocking and a transfer is made to a step 703. The step 703 computes the average value of M detected values of the No. k cylinder (more specifically $M = 16$). Thus, the computed value of the step 703 is used as the next knock detection level correction amount $\alpha_{k,\,n+1}$ of the No. k cylinder. If the result of the step 702 shows that $(KCNT)_{k,\,n} > K_{SL}$, the occurrence of knocking is determined and a transfer is made to a step 704. The step 704 determines whether the current operating condition is an acceleration. If the result of the determination shows that the engine is accelerating, a transfer is made to a step 708. The step 708 computes the average value of M detected values KCNT and it is set as a correction amount $\alpha_{k,\,n+1}$. Thus, the knock detection level correction amount is renewed. After the completion of the step 708, a transfer is made to a step 709.

On the other hand, if the determination of the step 704 shows that the engine is not accelerating, a transfer is made to a step 705. The step 705 compares the preceding (the (n−1)th ignition) detected value $(KCNT)_{k,\,n-1}$ (upon the occurrence of knocking) and the current detected value $(KCNT)_{k,n}$ (upon the ignition timing retard) of the No. k cylinder. If the result of the comparison shows that $(KCNT)_{k,\,n-1} \geq (KCNT)_{k,\,n}$, a transfer is made to a step 707 so that the current value is used as the knock detection correction amount $\alpha$ for the (n+1)th ignition. After the completion of the step 707, a transfer is made to the step 709.

If the result of the step 705 shows that $(KCNT)_{k,\,n-1} < (KCNT)_{k,\,n}$, it is an indication that the detected value has increased despite the ignition timing retard and thus the detection level correction amount $\alpha$ is corrected. At a step 706, the sum of the current detected value $(KCNT)_{k,\,n}$ and a correction amount $k_2$ is set as the correction amount $\alpha_k$, n+1.

Thus, in accordance with this embodiment, the knock detection level correction amount $\alpha$ is corrected by each knock detected value and hence the knock detection level $K_{SL}$ is corrected ($K_{SL} = \alpha + K_1$). This has the effect of overcoming the variations in knocking among the cylinders and the effects of their aging thereby always maintaining the proper detection level and ensuring the positive detection of knock.

Figure 14:
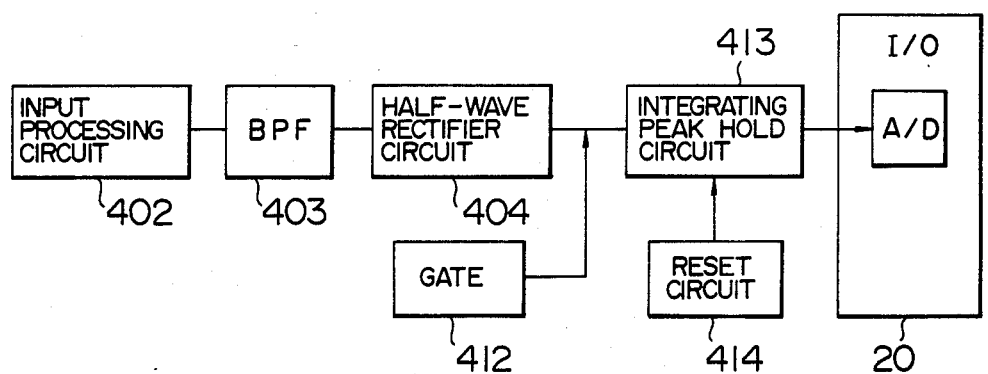
FIG. 14 is a block diagram showing another embodiment of the knock detecting device.

Referring now to the block diagram of FIG. 14 showing another embodiment of the knock detecting device, a gate 412 controls the input to a peak hold circuit 413 and it serves the function of applying to the peak hold circuit 413 the output of a half-wave rectifier 404 which is generated at 10 to 70 degrees ATDC. The peak hold circuit 413 applies its output to the A/D converter in the I/O unit 20. A reset circuit 414 serves the function of resetting the peak hold circuit 413.

Figure 15:
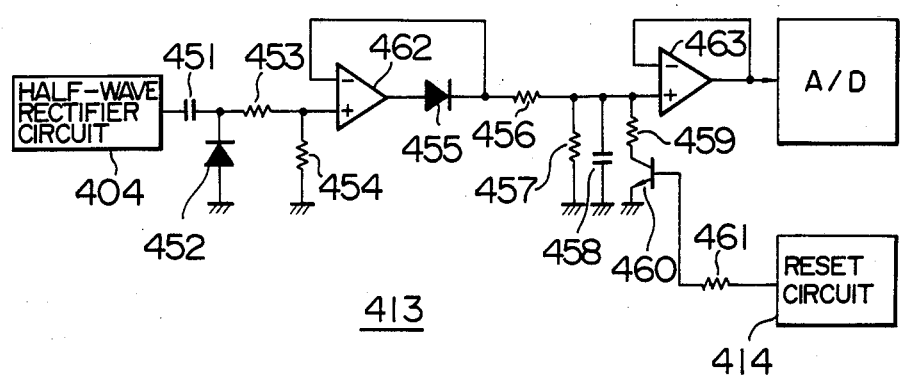
FIG. 15 is a circuit diagram showing an embodiment of the integration peak hold circuit.

Referring now to FIG. 15, there is illustrated a specific embodiment of the peak hold circuit 413.

The peak hold circuit 413 comprises capacitors 451 and 458, diodes 452 and 455, resistors 453, 454, 456, 457, 459 and 461, a transistor 460, an operational amplifier 462 and an operational amplifier 463 forming a buffer circuit.

The capacitor 451 and the diode 452 convert the half-wave rectified signal to a waveform which is positive with respect to the ground level (actually more positive than $-V_F$ of the diode 452) and this waveform charges the capacitor 458. When the peak hold circuit 413 is reset, the transistor 460 is turned on through the resistor 461 and the charged voltage across the capacitor 458 is discharged through the resistor 459.

Figure 16:
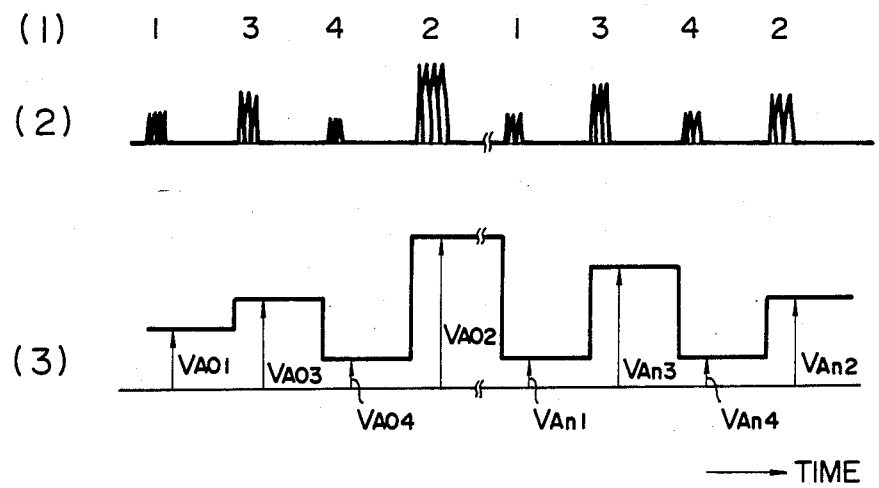
FIG. 16 illustrates a plurality of signal waveforms for explaining the operation of the knock detecting device of FIG. 11.

Referring now to FIG. 16 showing various waveforms for explaining the operation of the knock detecting device, in (1) of the Figure the numerals show the cylinder numbers and shown in (2) is the half-wave rectified output. Also, shown in (3) of the Figure is the input to the A/D converter (the output of the operational amplifier 463). Designated by $V_{An1}$ is the A/D converter input at the time of the nth ignition of the No. 1 cylinder.

Figure 17:
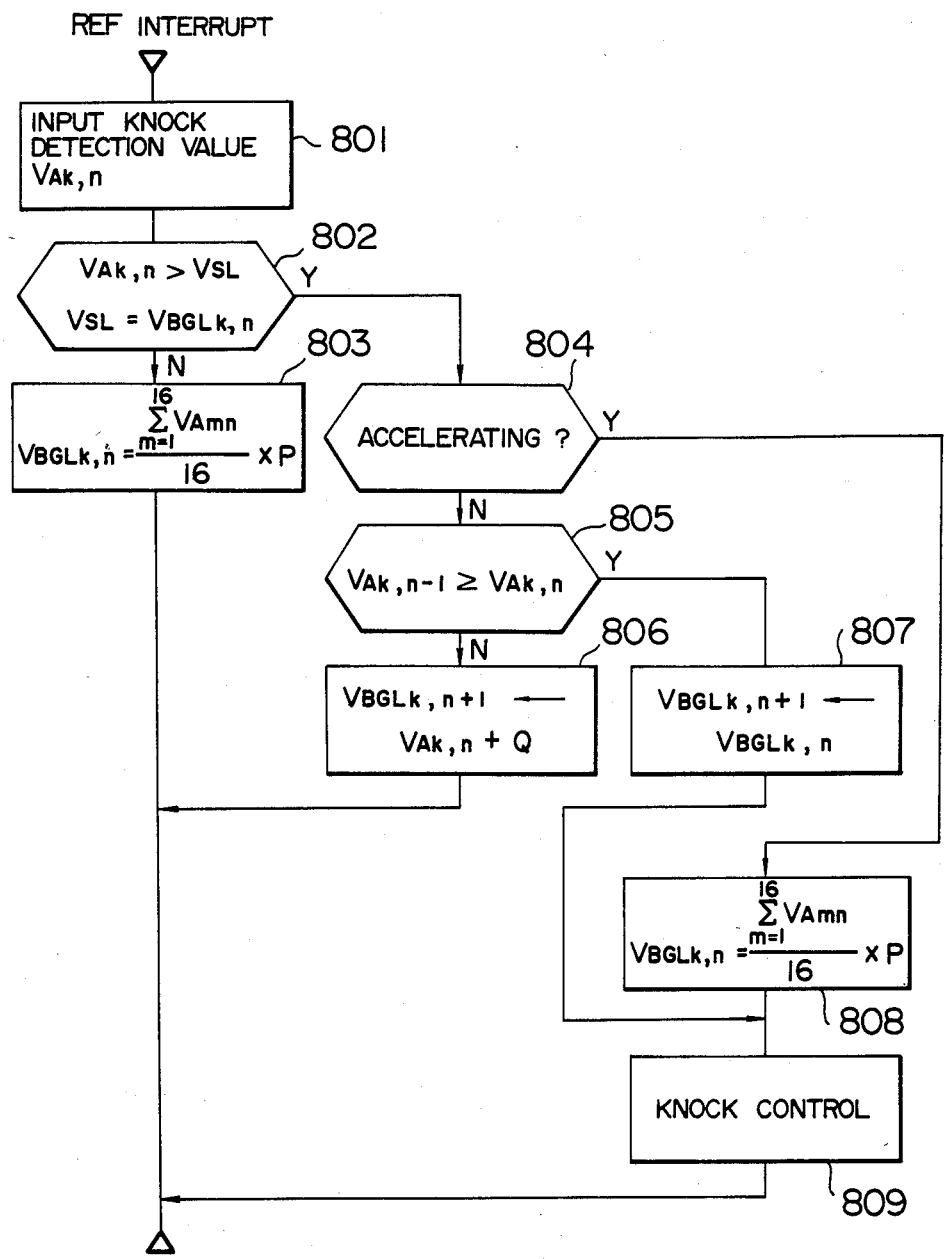
FIG. 17 is a flow chart showing another example of the rotation synchronization processing routine.

Referring now to the flow chart of FIG. 17, at a step 802, the inputted A/D converted value $V_{An1}$ for the nth ignition of the No. k cylinder is compared with the knock detection level $V_{SL}$ to make a decision as to the presence of knocking. If $V_{An1} \geq V_{SL}$, the presence of knocking is determined. If $V_{An1} < V_{SL}$, the absence of knocking is determined.

After the presence of knocking has been determined, at a step 805, a comparison is made between the A/D converted value $V_{Ak, n-1}$ at the time of occurrence of knocking and the A/D converted value $V_{Ak, n}$ after the ignition timing retard. If $V_{Ak, n-1} < V_{Ak, n}$, the next knock detection level $V_{BGL, n+1}$ is changed to $V_{Ak, n+Q}$ (a step 806).

If $V_{Ak, n-1} > V_{Ak, n}$, the current knock detection level $V_{BGLk, n}$ is used as the next knock detection level $V_{BGLk, n+1}$ (a step 807).

In the case of the absence of knocking, the knock detection level is corrected to the average value of 16 A/D converted values. In other words, it is corrected as follows (a step 803).

$$V_{BGLk, n} = \frac{\sum_{m=1}^{16} V_{Amn}}{16} \times P$$

Then, the thus corrected $V_{BGLk, n}$ is used for the next (n+1)th ignition.

In the case of the presence of knocking, if the engine is accelerating, the knock detection level is also corrected as follows (a step 808)

$$V_{BGLk, n} = \frac{\sum_{m=1}^{16} V_{Amn}}{16} \times P$$

This knock detection level is used for the next (n+1)th ignition and then the processing proceeds to the knock control.

Thus, in accordance with the present embodiment, the knock detection level is always corrected to the proper value and the accurate detection of knocking is always ensured irrespective of the variations in knocking characteristics among the cylinders and changes in the characteristics of the sensor.

From the foregoing description it will be seen that in accordance with the present invention, by virtue of the fact that the level of knock detection on the basis of a knock detection signal is successively corrected to the proper value, there is provided an ignition timing control apparatus for an internal combustion engine which overcomes the deficiencies in the prior art and is capable of always accurately detecting the occurrence of knocking and performing the proper knock control irrespective of the variations in knocking characteristics among the engine cylinders and the aging of the knock sensor thus ensuring the desired engine performance.

What is claimed is:

1. An ignition timing control apparatus for an internal combustion engine having a plurality of cylinders comprising:
   a knock sensor for detecting a knocking condition in said engine and for producing a knock signal in response thereto;
   sensors for detecting other operating conditions of said engine; and
   control means including computing means and memory means responsive to signals from said sensors for determining an ignition timing of said engine and for generating an ignition timing control signal, whereby in accordance with an ignition timing control signal from said control means a primary current in an ignition coil is switched on and off to generate a high-voltage ignition signal;
   said control means being responsive to a first discrimination level and a second discrimination level which is greater than the first discrimination level and comprising means for:
   (1) determining a basic ignition timing of said engine in response to outputs of said sensors other than said knock sensor,
   (2) retarding the ignition timing of said engine by a predetermined amount from said basic ignition timing when the intensity of said knock signal is greater than said first discrimination level but less than said second discrimination level,
   (3) restoring a retarded ignition timing gradually up to said basic ignition timing of said engine when the intensity of said knock signal becomes less than said first discrimination level, and
   (4) retarding a maximum advance angle by a predetermined amount, until the retarded ignition timing is restored, when the intensity of said knock signal is greater than the second discrimination level.

2. An ignition timing control apparatus for an internal combustion engine having a plurality of cylinders comprising:

a knock sensor for detecting a knocking condition in said engine on the basis of a selected detection level and for producing a knock signal in response thereto;

sensors for detecting other operating conditions of said engine; and control means including computing means and memory means responsive to signals from said sensors for determining a basic ignition timing of said engine and for generating an ignition timing control signal, whereby in response to said ignition timing control signal from said control means a primary current in an ignition coil is switched on and off to generate a high-voltage ignition signal;

said control means comprising means for:

(1) retarding the ignition timing of said engine by a predetermined amount from said basic ignition timing when the intensity of a knock signal produced by said knock sensor is greater than a predetermined level, (2) comparing the level of said knock signal generated in the absence of an ignition timing retard control due to the occurrence of a knock and the level of said knock signal generated after said ignition timing retard control has been performed upon occurrence of a knock, and (3) correcting said knock signal detection level when the level of said knock signal generated after said retard control is greater than the level of said knock signal generated in the absence of said retard control.

3. An ignition timing control apparatus for an internal combustion engine having a plurality of cylinders comprising:

a knock sensor for detecting a knocking condition in said engine and for producing a knock signal with reference to a detection signal;

sensors for detecting other operating conditions of said engine;

means responsive to signals from said sensors other than said knock sensor for determining a basic ignition timing;

means responsive to a knock signal from said knock sensor for retarding said basic ignition timing;

means for comparing the level of a knock signal generated in the absence of an ignition timing retard control due to the occurrence of a knock and the level of a knock signal generated after said ignition timing retard control is performed upon occurrence of a knock; and means for correcting the knock signal detection signal when the level of said knock signal generated after said retard control is greater than the level of said knock signal generated in the absence of said retard control.

* * * * *